United States Patent
Leung et al.

(10) Patent No.: US 12,456,085 B2
(45) Date of Patent: Oct. 28, 2025

(54) ANOMALY DETECTION OF MISCODED TAGS IN DATA FIELDS

(71) Applicant: WORKDAY, INC., Pleasanton, CA (US)

(72) Inventors: Andy Leung, Richmond (CA); Mayur Pandya, Oakland, CA (US); Jon Nelson, Denville, CA (US); Dalmo Cirne, Longmont, CO (US); Doron Zehavi, Venloe, CA (US)

(73) Assignee: WORKDAY, INC., Pleasanton, CA (US)

( * ) Notice: Subject to any disclaimer, the term of this patent is extended or adjusted under 35 U.S.C. 154(b) by 183 days.

(21) Appl. No.: 17/698,458

(22) Filed: Mar. 18, 2022

(65) Prior Publication Data

US 2023/0297916 A1    Sep. 21, 2023

(51) Int. Cl.
| | |
|---|---|
| *G06Q 10/00* | (2023.01) |
| *G06Q 10/0635* | (2023.01) |
| *G06Q 30/00* | (2023.01) |
| *G06Q 30/018* | (2023.01) |

(52) U.S. Cl.
CPC ..... *G06Q 10/0635* (2013.01); *G06Q 30/0185* (2013.01)

(58) Field of Classification Search
CPC .............................. G06Q 10/00; G06Q 50/00
USPC ........................................................ 705/7.28
See application file for complete search history.

(56) References Cited

U.S. PATENT DOCUMENTS

| | | | | |
|---|---|---|---|---|
| 2020/0380570 | A1* | 12/2020 | Ramakrishnan | .... G06F 18/2148 |
| 2021/0241299 | A1* | 8/2021 | Ramini | ................. G06N 5/025 |
| 2022/0044341 | A1* | 2/2022 | Mizrahi | ................. G06Q 30/02 |
| 2023/0186150 | A1* | 6/2023 | Belakaria | ............... G06N 20/10 |
| | | | | 706/12 |
| 2023/0186214 | A1* | 6/2023 | Parrish | ..................... G06N 3/08 |
| | | | | 705/36 R |
| 2023/0196420 | A1* | 6/2023 | Yadav | .................... G06Q 10/10 |
| | | | | 705/34 |

OTHER PUBLICATIONS

Ben-Gal I., Bayesian Networks, Encyclopedia of Statistics in Quality & Reliability, Wiley & Sons, 6 pages (2007).
Falkner et al., "BOHB: Robust and Efficient Hyperparameter Optimization at Scale," Proceedings of the 35th International Conference on Machine Learning, 10 pages (2018).

* cited by examiner

*Primary Examiner* — Mustafa Iqbal
(74) *Attorney, Agent, or Firm* — James J. DeCarlo; Greenberg Traurig, LLP

(57) ABSTRACT

The techniques described herein relate to a method including: receiving, by a processor, a data record having a plurality of fields; generating, by the processor, a risk score for the data record using a predictive model; determining, by the processor, that the data record is a potential anomaly based on the risk score; identifying, by the processor, an anomalous field from the plurality of fields; generating, by the processor, a plurality of permutations of the data record, the plurality of permutations generated by changing a value of the anomalous field; and outputting, by the processor, a replacement record selected from the plurality of permutations, the replacement record having a field value for the anomalous field that generates a lowest risk score among the plurality of permutations.

20 Claims, 8 Drawing Sheets

| | LOCATION ID | CATEGORY | ITEM | REGION | SCORE |
|---|---|---|---|---|---|
| | CC1234 | Catering | Bagels | EU | 45 |
| | CC5678 | Artwork | Painting | US East | 25 |
| | CC1234 | Catering | Bagels | US South | 5 |

FIG. 5

ANOMALY DETECTION OF MISCODED TAGS IN DATA FIELDS

BACKGROUND

Anomaly detection is a process of identifying records in a sequence of records that deviate in some capacity from an expected range or trend of values. Simple anomalies can be detected using hard-coded logic (e.g., Boolean logic). For example, a data field having a value exceeding a maximum value can be identified as anomalous. However, logic-based systems frequently can only detect simplistic rules and require constant maintenance to adjust to changes in the underlying data stream.

Journal entries are records that detail financial transactions that occur within the business. Examples are expense reports, supplier invoices, and payroll. These records are the source of truth for accounting and audit. Traditional accounting and auditing are labor-intensive processes requiring small armies of professionals to pore over gigantic amounts of data to review, investigate, and correct journal entries on a multitude of accounting journals. One of the most common mistakes in journal entries is misclassification, like using the wrong cost center, spend category, location, region, etc. Misclassification impacts the numbers that get reported on financial statements and internal reports used for managing the business. The adoption of rules-based systems in the past decade helped to catch these kinds of mechanical errors, but they fall short in identifying patterns that cannot be trivially constructed as rules. Furthermore, they require constant intervention to adapt to ever-changing business needs. Such systems are increasingly burdensome to maintain and scale after the first installation and configuration.

BRIEF DESCRIPTION OF THE DRAWINGS

FIG. 5 is a diagram illustrating data records and corresponding scores according to some of the example embodiments.

DETAILED DESCRIPTION

Figure 1:
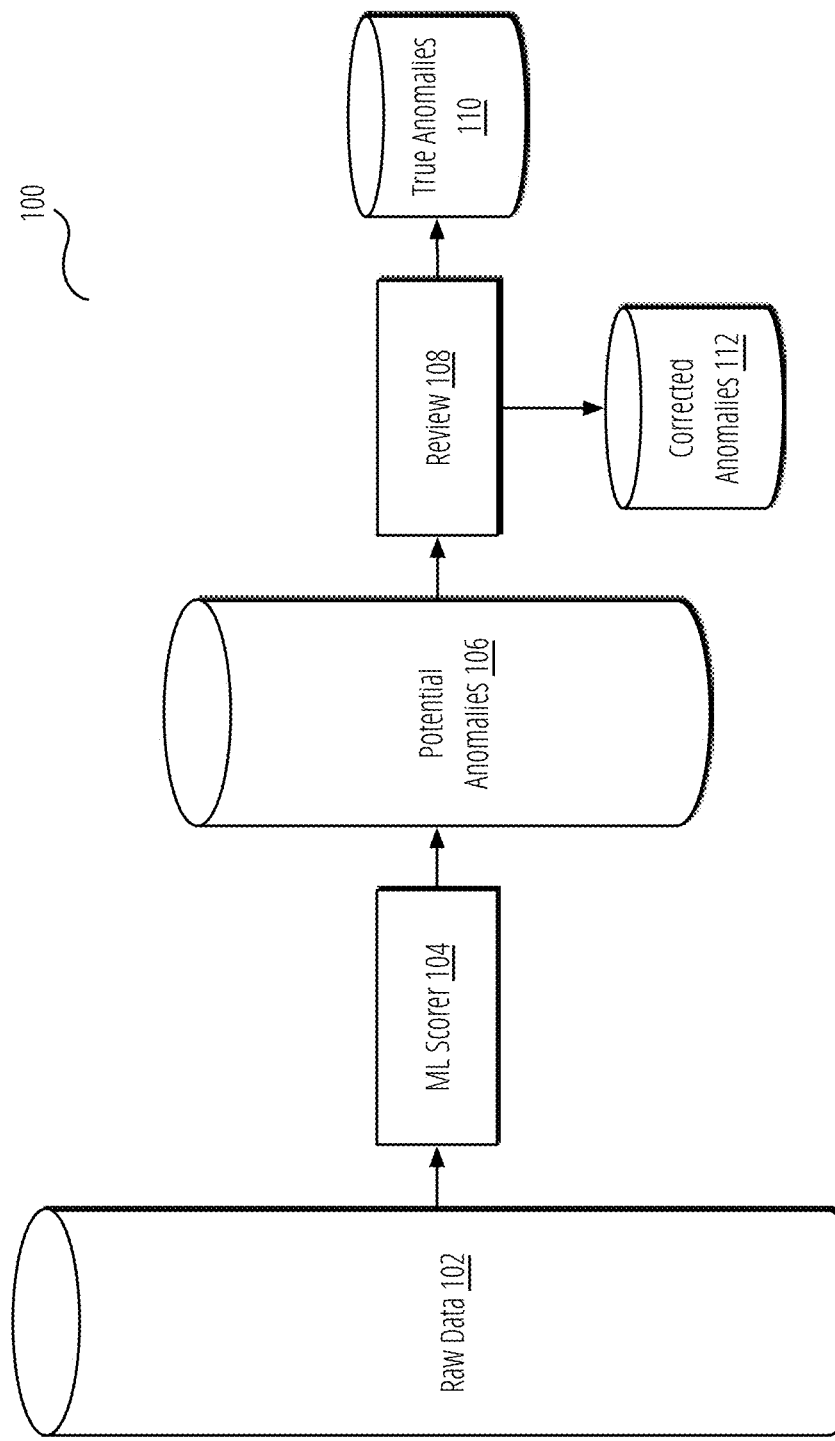
FIG. 1 is a block diagram of a system for detecting anomalies in a dataset according to some of the example embodiments.

The example embodiments remedy the above problems by providing a two-stage machine learning solution that automatically identifies anomalies from a set of data records using a machine learning model and generates replacement data records by re-using the same machine learning model. Specifically, data records are fed into a machine learning scorer, which generates a risk score for each data record. The machine learning scorer can comprise an unsupervised model that can assess how unlikely a given data record is given a corpus of historical data records. Those records having risk scores above a threshold are flagged as potential anomalies. Each potential anomaly is then iteratively processed to identify which field within the underlying data record caused the anomaly. During this process, the embodiments sequentially remove each field and re-calculate a risk score for each version of the data record with fields removed. The lowest-scoring record is then used to generate permutations of the record where the anomaly-causing field's value is replaced with a set of candidate values. Each of these permutations is scored, and the lowest scoring permutation is used as a potential replacement data record for a given potential anomaly.

The foregoing embodiments eliminate the use of brittle business rules and avoid human error when reviewing records. The use of a machine learning model means that the scoring algorithm can be continuously updated based on changes in the underlying data. Finally, the number of permutations can be determined based on a number of most likely values (avoiding rare values) and can thus rapidly identify potential corrections to anomalies, a process not subject to trial and error or human bias.

In the following disclosure, the techniques relate to a method including receiving, by a processor, a data record having a plurality of fields; generating, by the processor, a risk score for the data record using a predictive model; determining, by the processor, that the data record is a potential anomaly based on the risk score; identifying, by the processor, an anomalous field from the plurality of fields; generating, by the processor, a plurality of permutations of the data record, the plurality of permutations generated by changing a value of the anomalous field; and outputting, by the processor, a replacement record selected from the plurality of permutations, the replacement record having a field value for the anomalous field that generates the lowest risk score among the plurality of permutations.

The techniques described herein also relate to a method wherein generating risk scores using the predictive model includes generating the risk scores using a Bayesian network.

The techniques described herein also relate to a method, further including selecting the subset of fields for training the Bayesian network using a Bayesian Optimization and Hyperband (BOHB) algorithm.

The techniques described herein also relate to a method wherein determining that the data record is a potential anomaly based on the risk score includes determining if the risk score exceeds a preconfigured threshold.

The techniques described herein also relate to a method, wherein identifying the anomalous field from the plurality of fields includes: iteratively removing each field from the plurality of fields to generate candidate data records; scoring each of the candidate data records using the predictive model; selecting a candidate data record ranked with the lowest risk score; and identifying a field removed from the candidate data record as the anomalous field.

The techniques described herein also relate to a method, wherein generating the plurality of permutations of the data record includes identifying a plurality of potential values for the anomalous field, setting a value of the anomalous field to each of the plurality of potential values to generate the plurality of permutations, and scoring each of the plurality of permutations using the predictive model.

The techniques described herein also relate to a method, wherein further including selecting the replacement record selected from the plurality of permutations by selecting a permutation from the plurality of permutations ranked with the lowest risk score.

A non-transitory computer-readable storage medium for tangibly storing computer program instructions capable of being executed by a computer processor and a system including a processor for performing the above methods are also disclosed.

FIG. 1 is a block diagram of a system for detecting anomalies in a dataset according to some of the example embodiments.

System 100 includes a raw datastore 102, a machine learning (ML) scoring stage (ML scorer 104), a potential anomaly datastore 106, a review phase 108, a true anomaly datastore 110, and a corrected anomaly datastore 112. In some embodiments, the anomaly datastore 110 and the corrected anomaly datastore 112 can comprise the same datastore. As illustrated, system 100 can be implemented as a pipeline such that raw data stored in raw datastore 102 is ultimately filtered down to only true anomalous data points in the raw data.

In the various embodiments, raw data stored in raw datastore 102 can take a variety of forms, and the disclosure is not limited to a specific type of data. In general, the raw data comprises data records, each data record comprising a set of fields and corresponding values. For example, a data record can comprise a row of a database table wherein the columns comprise the fields, and the values for the columns comprise the corresponding values. FIG. 5 provides one example of data records, and reference is made to that description for further discussion of an example of a data record.

In an embodiment, raw data stored in raw datastore 102 can be generated during the normal operations of a computer system. For example, a network application (e.g., website) can generate data records when responding to Hypertext Transfer Protocol (HTTP) requests. For example, the data records can include log entries recorded by a web server. As another example, raw data in raw datastore 102 can include ledger entries of expenses of an organization (e.g., entered automatically or manually). In some embodiments, the raw data in raw datastore 102 can be grouped temporally. That is, the raw data can be organized into segments based on time periods. For example, ledger entries can be organized into monthly "buckets" of data records. Alternatively, or in conjunction with the foregoing, the raw data in raw datastore 102 can be segmented based on the owner of the data. Thus, raw datastore 102 can include multiple "tenants" having similarly structured data.

In some embodiments, raw datastore 102 can be accessed programmatically by ML scorer 104. For example, if raw datastore 102 comprises a relational or another type of database (e.g., NoSQL), the ML scorer 104 can issue network requests to the database to retrieve data using, for example, Structured Query Language (SQL) or a similar type of data query language (DQL).

In an embodiment, the ML scorer 104 is configured to read one or more data records from raw datastore 102 and identify potential anomalies. In some embodiments, the ML scorer 104 is configured to score each data record to generate a score representing how likely it is that the data record is anomalous relative to the entire dataset. In some embodiments, the ML scorer 104 can write each data record and its score to potential anomaly datastore 106. In other embodiments, ML scorer 104 can only write data records having a corresponding score above a threshold to potential anomaly datastore 106. In some embodiments, the potential anomaly datastore 106 can comprise a database or another type of data storage device, like raw datastore 102. Further details on ML scorer 104 are provided in FIG. 2 and are not repeated herein.

Review phase 108 is configured to read potentially anomalous data records from potential anomaly datastore 106 and identify true anomalies (stored in true anomaly datastore 110) or generate corrected anomalies (stored in corrected anomaly datastore 112). In some embodiments, the review phase 108 is configured to detect, for each record, a field that most likely caused an anomaly. Next, review phase 108 can generate a plurality of permutations that replace the anomalous field value with other values. The review phase 108 can score each of these permutations and identify a possible replacement data record. In some embodiments, review phase 108 can present the replacement data record to a user (e.g., a human auditor) to confirm that the replacement is valid. Details of review phase 108 are provided in the following figures and are not repeated herein.

In some embodiments, the system 100 can be implemented as a network service, continuously processing batches of data records from raw datastore 102 and segmenting anomalies into potential anomaly datastore 106, true anomaly datastore 110, and corrected anomaly datastore 112 as described above.

Figure 2:
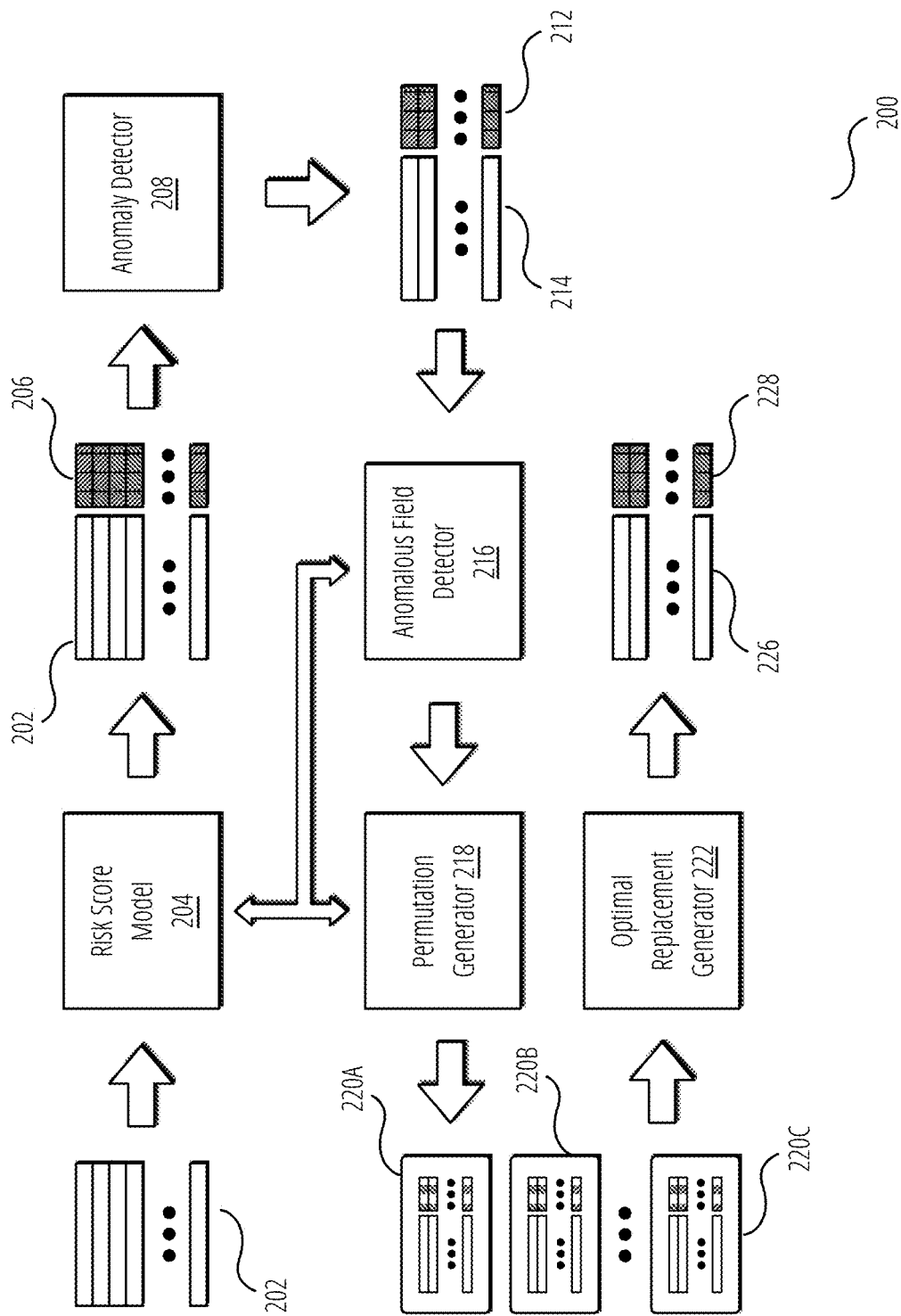
FIG. 2 is a block diagram of a system for generating an anomaly replacement for a data record according to some of the example embodiments.

FIG. 2 is a block diagram of a system for generating an anomaly replacement for a data record according to some of the example embodiments.

In system 200, data records 202 are ingested as input. Details on the structure of data records were provided previously and are not repeated herein. A risk score model 204 ingests the data records 202 and outputs the data records 202 and scores 206. As illustrated, risk score model 204 generates a corresponding score for each of the data records 202. In some embodiments, the risk score model 204 can only output scores (and outputted data records are illustrated for convenience).

In an embodiment, the risk score model 204 can comprise any machine learning model capable of generating a continuous value (e.g., a numerical value) representing how anomalous a given data record is from a corpus of historical documents. In general, such a model would be trained using historical corpora of data records to learn patterns and detect anomalies that deviate from those patterns. In one embodiment, the risk score model 204 can comprise a probabilistic model, and the output of the risk score model 204 can be a value between zero and one (or, similarly, zero to one hundred). In one embodiment, the risk score model 204 can comprise a probabilistic graphical model (GM). In an embodiment, the risk score model 204 can comprise a Bayesian network or belief network. With a Bayesian model, the risk score model 204 is trained in an unsupervised manner by feeding historical data records into the model during a training phase. During this training phase, the Bayesian model learns the relationship between fields of the data records. In some embodiments, fewer than all fields for a data record schema may be considered. Specifically, some fields of historical data records may be more relevant than others in detecting anomalies. Thus, in some embodiments, during the training phase, only a subset of the fields of historical data records may be used to build the risk score model 204. In some embodiments, the training phase can use a Bayesian Optimization and Hyperband (BOHB) algorithm to reduce the number of fields considered by the risk score model 204. In some embodiments, the chosen fields used to train the model can be chosen exclusively by the BOHB algorithm.

In some embodiments, users can manually specify fields that must be included in the training. In some embodiments, these user-defined fields can be used in addition to the BOHB-selected fields. During training, the BOHB algorithm will iteratively search for a subset of fields in data records that would result in a Bayesian network model with the best association with the user-defined fields. The resulting trained model will therefore be as relevant to the user-defined fields as possible for detecting relevant data record patterns and behaviors. In some embodiments, the field searching process and training process can run continuously to remain synchronized with changes in data records.

The risk score model 204 feeds data records 202 and scores 206 to an anomaly detector 208. The anomaly detector 208 can output potentially anomalous data records 214 and scores 212 corresponding to the potentially anomalous data records 214. In an embodiment, the anomaly detector 208 can use a score threshold to select the potentially anomalous data records 214. Specifically, the anomaly detector 208 can use a numerical score value to segment the data records 202 into non-anomalous data records and potentially anomalous data records 214. In some embodiments, the score threshold can comprise a fixed value (e.g., 0.25). In other embodiments, the score threshold can be set dynamically based on historical data records or the raw data input to risk score model 204 itself. Specifically, system 200 can generate risk scores for a set of data records and then analyze the distribution of risk scores to determine a score threshold. For example, a specific quantile can be used as a score threshold. For example, the value at the 0.999 quantile of the distributed risk scores can be used as a score threshold. In some embodiments, this process can be performed on a historical set of data records to generate the score threshold. In other embodiments, the anomaly detector 208 can perform the process on scores 206 to generate the score threshold.

The anomaly detector 208 provides potentially anomalous data records 214 and scores 212 to an anomalous field detector 216. The anomalous field detector 216 processes each record in potentially anomalous data records 214 and identifies which field caused the anomaly. For a given data record R, the anomalous field detector 216 processes a set of fields $F=\{f_0, f_1, \ldots f_N\}$ sequentially by removing the corresponding value from the given data record for each field. In some embodiments, the value of N corresponds to the fields used to train the model in risk score model 204 and can thus be configurable to manage the algorithmic complexity of the process. For example, ten fields (N=10) may be selected to ensure the anomalous field detector 216 does not overutilize computing resources.

In some embodiments, anomalous field detector 216 can remove a corresponding value by removing the field from the record. In other embodiments, anomalous field detector 216 can remove a corresponding value by setting the corresponding value to a "zero" value (e.g., zero for numeric types, an empty string for string types, etc.). In other embodiments, anomalous field detector 216 can remove a corresponding value by setting the corresponding value to a null or nil type. The foregoing examples of zero or null/nil are not limiting, and any representation of a missing value can be used. The anomalous field detector 216 then inputs the data record with the corresponding value removed to the risk score model 204 to generate a risk score for the data record with the corresponding value removed. As discussed, anomalous field detector 216 performs this process for each field and for each record in potentially anomalous data records 214.

For each scored data record with a corresponding value removed, anomalous field detector 216 determines which data record with the corresponding value removed has the lowest risk score. In other embodiments, the risk scores can be inverted, and the anomalous field detector 216 determines which data record with the corresponding value removed has the highest risk score. In general, for most anomalous records, a single field will be the cause of the anomaly (e.g., a mistyped or misclassified field). As such, the above process sequentially inspects each field to gauge its impact on the risk score. For most fields, removal of the fields will result in a cluster of risk scores around a mean, anomalous risk score. However, removal of the anomalous field will often result in a drastic risk score change that renders the data record non-anomalous. As such, when the anomalous field detector 216 detects such a drastic risk score change (by identifying the lowest or highest risk score), the anomalous field detector 216 can identify the field that was removed and use the removed field as the anomalous field.

In some embodiments, the anomalous field detector 216 can provide, for each data record, the anomalous field to a permutation generator 218. In some embodiments, the anomalous field detector 216 can also provide the potentially anomalous data records 214 and scores 212. In response, the permutation generator 218 can generate possible replacement data records (e.g., replacement records 220A, replacement records 220B, and replacement records 220C).

In an embodiment, the permutation generator 218 load a data record from potentially anomalous data records 214 and generates permutations by replacing the value of the anomalous field of the data record with alternative values. In some embodiments, the anomalous field comprises a categorical value, and the permutation generator 218 can generate a set of possible values from the original data set. For example, if the data records are stored in a relational database, the permutation generator 218 can get all possible values for a given field (i.e., column) by issuing an SQL command (e.g., SELECT DISTINCT column FROM table, where column comprises the anomalous field and table represents the raw data) to the database. Then, the permutation generator 218 can iterate through the possible values for a field and generate new records, each new record having a different value for the anomalous field.

In some embodiments, the permutation generator 218 can limit the total number of possible values used in the above process. For example, for some fields, the number of possible values can be large. Thus, in some embodiments, the permutation generator 218 can select a subset of possible values to use in generating permutations. For example, the permutation generator 218 can only use the top n values for a given anomalous field. As used herein, top values refer to values occurring most frequently in historical records as values of the anomalous field. In this manner, the value of n can be used (along with the value of N described previously in connection with anomalous field detector 216) to control the runtime of the system and conserve computational resources of the system while providing high-quality replacement data records.

The permutation generator 218 is further configured to score each permutation. Specifically, after inserting a new value for the anomalous field of a permutation, the permutation generator 218 can transmit the permutation to the risk score model 204 and receive a risk score for the permutation. The permutation generator 218 attaches this risk score to each permutation and bundles each permutation and risk score for a given data record as replacement records (e.g., replacement records 220A, replacement records 220B, replacement records 220C). As illustrated, each data record in potentially anomalous data records 214 is thus associated with a set of candidate replacement records and corresponding scores in replacement records 220A, replacement records 220B, replacement records 220C, etc.

An optimal replacement generator 222 receives the replacement records (e.g., replacement records 220A, replacement records 220B, replacement records 220C) and selects an optimal replacement record for each data record. The optimal replacement generator 222 can then output replacement records 226 corresponding to each data record in the potentially anomalous data records 214 as well as the corresponding scores 228 generated by permutation generator 218. In some embodiments, the optimal replacement generator 222 can be configured to select the lowest risk score for a given set of replacement records and scores. In some embodiments, the optimal replacement generator 222 can only output a single record for each data record in potentially anomalous data records 214. However, in other embodiments, if multiple replacement records score equally low, optimal replacement generator 222 may output all equally scored records for human review.

In some embodiments, optimal replacement generator 222 can use the score threshold (described previously) to determine if any replacement records are suitable for replacement. For example, if all replacement regards have high-risk scores (above the score threshold), the optimal replacement generator 222 can discard all replacement data records and flag the data record as a true anomaly that cannot be resolved without manual review.

Figure 3:
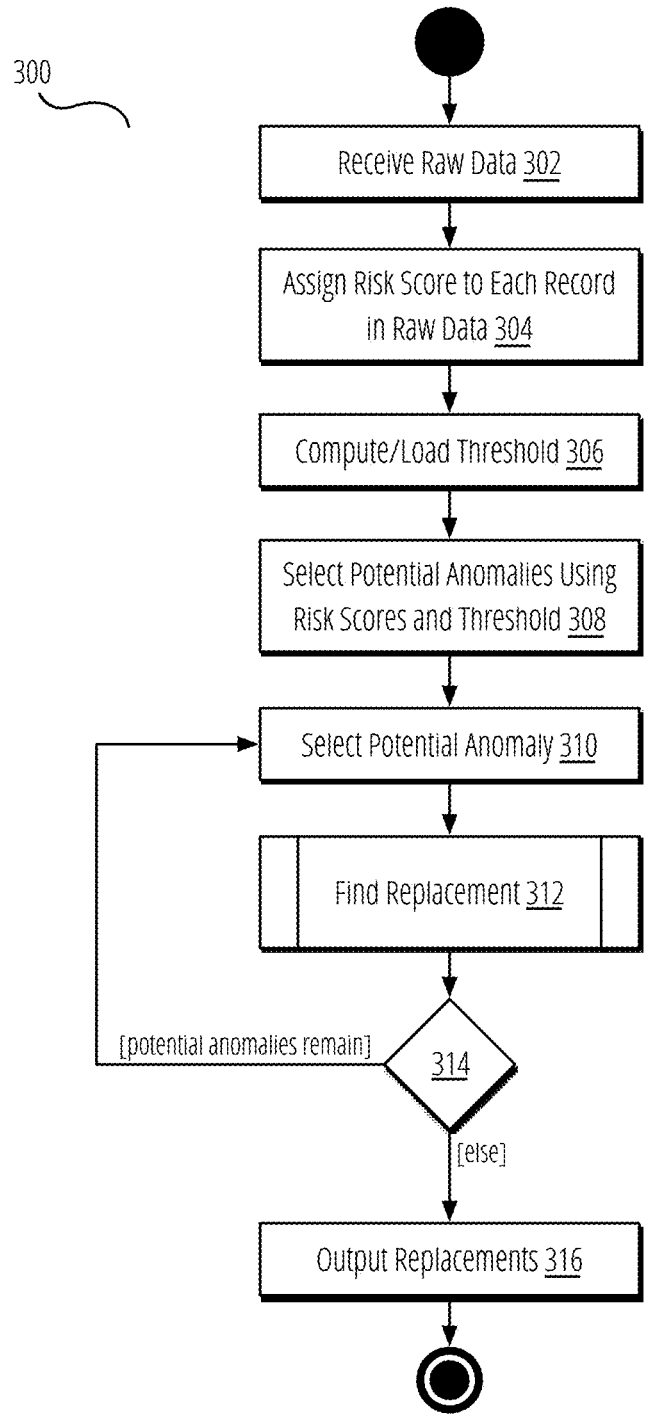
FIG. 3 is a flow diagram illustrating a method for detecting anomalies in a dataset according to some of the example embodiments.

FIG. 3 is a flow diagram illustrating a method for detecting anomalies in a dataset according to some of the example embodiments.

In step 302, method 300 can include receiving raw data. In some embodiments, the raw data can be retrieved from a data store of raw data. In the various embodiments, raw data can take a variety of forms, and the disclosure is not limited to a specific type of data. In general, the raw data comprises data records, each data record comprising a set of fields and corresponding values. For example, a data record can comprise a row of a database table wherein the columns comprise the fields, and the values for the columns comprise the corresponding values. FIG. 5 provides one example of data records, and reference is made to that description for further discussion of an example of a data record. Further details on the format of raw data are provided in connection with FIG. 1 and not repeated herein.

In step 304, method 300 can include assigning a risk score to each data record in the raw data.

In some embodiments, step 304 can include inputting each of the data records into a risk score model. A risk score model ingests the data records and outputs the data records and scores. As illustrated, the risk score model generates a corresponding score for each of the data records. In some embodiments, the risk score model can only output scores.

In an embodiment, the risk score model can comprise any machine learning model capable of generating a continuous value (e.g., a numerical value) representing how anomalous a given data record is from a corpus of historical documents. In general, such a model would be trained using historical corpora of data records to learn patterns and detect anomalies that deviate from those patterns. In one embodiment, the risk score model can comprise a probabilistic model, and the output of the risk score model can be a value between zero and one (or, similarly, zero to one hundred). In one embodiment, the risk score model can comprise a probabilistic GM. In an embodiment, the risk score model can comprise a Bayesian network or belief network. With a Bayesian model, the risk score model is trained in an unsupervised manner by feeding historical data records into the model during a training phase. During this training phase, the Bayesian model learns the relationship between fields of the data records. In some embodiments, fewer than all fields for a data record schema may be considered. Specifically, some fields of historical data records may be more relevant than others in detecting anomalies. Thus, in some embodiments, during the training phase, only a subset of the fields of historical data records may be used to build the risk score model. In some embodiments, the training phase can use a BOHB algorithm to reduce the number of fields considered by the risk score model. In some embodiments, the chosen fields used to train the model can be chosen exclusively by the BOHB algorithm.

In some embodiments, users can manually specify fields that must be included in the training. In some embodiments, these user-defined fields can be used in addition to the BOHB-selected fields. During training, the BOHB algorithm will iteratively search for a subset of fields in data records that would result in a Bayesian network model with the best association with the user-defined fields. The resulting trained model will therefore be as relevant to the user-defined fields as possible for detecting relevant data record patterns and behaviors. In some embodiments, the field searching process and training process can run continuously to remain synchronized with changes in data records.

In step 306, method 300 can include computing or loading a score threshold and, in step 308, selecting potential anomalies using the risk scores and score threshold.

In some embodiments, the score threshold can be either retrieved from a datastore or computed on the fly. In an embodiment, the score threshold can be a numerical score value to segment the data records into non-anomalous data records and potentially anomalous data records. In some embodiments, the score threshold can comprise a fixed value (e.g., 0.25). In other embodiments, the score threshold can be set dynamically based on historical data records or the raw data input to the risk score model itself. Specifically, method 300 can generate risk scores for a set of data records and then analyze the distribution of risk scores to determine a score threshold. For example, a specific quantile can be used as a score threshold. For example, the value at the 0.999 quantile of the distributed risk scores can be used as a score threshold. In some embodiments, this process can be performed on a historical set of data records to generate the score threshold. In other embodiments, method 300 can perform the process on scores to generate the score threshold.

In step 310, method 300 selects a potential anomaly. In some embodiments, method 300 can iterate through each identified potential anomaly, performing step 312 for each.

In step 312, method 300 finds a replacement data record for the potential anomaly selected in step 310. Details of step 312 are provided in FIG. 4 and are not repeated herein. In brief, step 312 can include detecting, for each record, a field that most likely caused an anomaly. Next, step 312 can include generating a plurality of permutations that replace the anomalous field value with other values. Next, step 312 can include scoring each of these permutations and identifying a possible replacement data record.

In step 314, method 300 determines if all potential anomalies were processed using step 312. If not, method 300 executes step 312 for each remaining potential anomaly until all potential anomalies have been processed.

In step 316, method 300 outputs the replacements found in step 312. In some embodiments, step 316 can include presenting the replacement data records to a user (e.g., a human auditor) to confirm that the replacements are valid. In some embodiments, step 316 can comprise transmitting the replacements (and scores) to a user for review or acceptance. In some embodiments, method 300 can output the replacements to a database or other storage medium.

Figure 4:
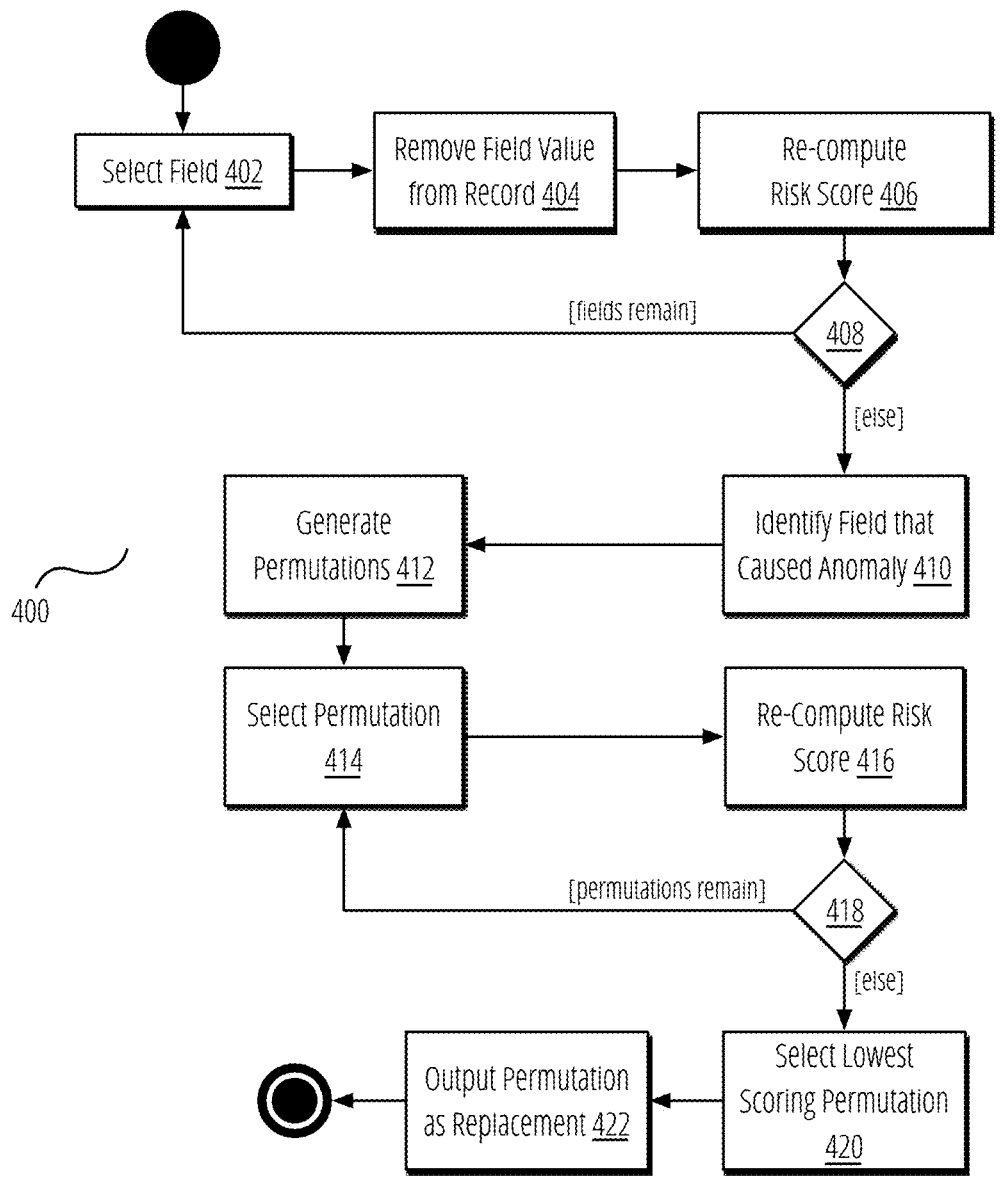
FIG. 4 is a flow diagram illustrating a method for generating an anomaly replacement for a data record according to some of the example embodiments

FIG. 4 is a flow diagram illustrating a method for generating an anomaly replacement for a data record according to some of the example embodiments In step 402, method 400 can include selecting a field of a potentially anomalous data record. In step 404, method 400 can include removing a corresponding value of the selected field from the potentially anomalous data record. In step 406, method 400 can include re-computing a risk score for the potentially anomalous data record after the corresponding value of the selected field was removed in step 404.

For a given data record R, the method 400 processes a set of fields $F=\{f_0, f_1, \ldots f_N\}$ sequentially by removing the corresponding value from the given data record for each field. In some embodiments, the value of N corresponds to the fields used to train the model in the risk score model and can thus be configurable to manage the algorithmic complexity of the process. For example, ten fields (N=10) may be selected to ensure that method 400 does not overutilize computing resources.

In some embodiments, method 400 can remove a corresponding value by removing the field from the record. In other embodiments, method 400 can remove a corresponding value by setting the corresponding value to a "zero" value (e.g., zero for numeric types, an empty string for string types, etc.). In other embodiments, method 400 can remove a corresponding value by setting the corresponding value to a null or nil type. The foregoing examples of zero or null/nil are not limiting, and any representation of a missing value can be used. Method 400 then inputs the data record with the corresponding value removed to the risk score model to generate a risk score for the data record with the corresponding value removed.

In step 408, method 400 determines if each field of the potentially anomalous data record was analyzed. If not, the method re-executes step 402, step 404, and step 406 for each remaining field.

In step 410, method 400 can include identifying the field that caused the anomaly in the potentially anomalous data record.

For each scored data record with a corresponding value removed, method 400 determines which data record with the corresponding value removed has the lowest risk score. In other embodiments, the risk scores can be inverted, and method 400 determines which data record with the corresponding value removed has the highest risk score. In general, for most anomalous records, a single field will be the cause of the anomaly (e.g., a mistyped or misclassified field). As such, the above process sequentially inspects each field to gauge its impact on the risk score. For most fields, removal of the fields will result in a cluster of risk scores around a mean, anomalous risk score. However, removal of the field identified in step 410 will often result in a drastic risk score change that renders the data record non-anomalous. As such, when method 400 detects such a drastic risk score change (by identifying the lowest or highest risk score), method 400 can identify the field that was removed and use the removed field as the field identified in step 410.

In step 412, method 400 can include generating a set of permutations for the data record based on varying the value of the field identified in step 410.

In an embodiment, method 400 can include generating permutations by replacing the value of the field identified in step 410 with alternative values. In some embodiments, the field identified in step 410 comprises a categorical value, and method 400 can generate a set of possible values from the original data set. For example, if the data records are stored in a relational database, method 400 can get all possible values for a given field (i.e., column) by issuing an SQL command (e.g., SELECT DISTINCT column FROM table) to the database. The foregoing example of a relational database is not intended to be limiting. As discussed previously, other types of databases (e.g., NoSQL, streaming, etc.) or a combination of heterogeneous databases can be used. Then, method 400 can iterate through the possible values for a field and generate new records, each new record having a different value for the field identified in step 410.

In some embodiments, method 400 can limit the total number of possible values used in the above process. For example, for some fields, the number of possible values can be large. Thus, in some embodiments, method 400 can select a subset of possible values to use in generating permutations. For example, method 400 can only use the top n values for a given field identified in step 410. As used herein, top values refer to values occurring most frequently in historical records as values of the field identified in step 410. In this manner, the value of n can be used (along with the value of N described previously) to control the runtime of the system and conserve the computational resources of the system while providing high-quality replacement data records.

In step 414, method 400 selects a permutation and, in step 416, re-computes a risk score for the permutation. In an embodiment, after inserting a new value for the field identified in step 410 of a permutation, method 400 can transmit the permutation to the risk score model and receive a risk score for the permutation. Method 400 can then attach this risk score to each permutation and bundle each permutation and risk score for a given data record as replacement records. Thus, each data record in potentially anomalous data records is associated with a set of candidate replacement records and corresponding scores.

In step 418, method 400 can include determining if all permutations were processed with step 416. If not, method 400 can include re-executing step 416 for all remaining permutations.

In step 420, method 400 can include selecting the permutation with the lowest risk score as the optimal replacement record.

In an embodiment, method 400 receives the replacement records and selects an optimal replacement record for each data record. Method 400 can then output replacement records corresponding to each data record in the potentially anomalous data records as well as the corresponding scores in step 422. In some embodiments, method 400 can be configured to select the lowest risk score for a given set of replacement records and scores. In some embodiments, method 400 can only output a single record for each data record in potentially anomalous data records. However, in other embodiments, if multiple replacement records score equally low, method 400 may output all equally scored records for human review.

In some embodiments, method 400 can use the score threshold (described previously) to determine if any replacement records are suitable for replacement. For example, if all replacement regards have high-risk scores (above the score threshold), method 400 can discard all replacement data records and flag the data record as an anomaly that cannot be resolved without manual review.

Figure 6:
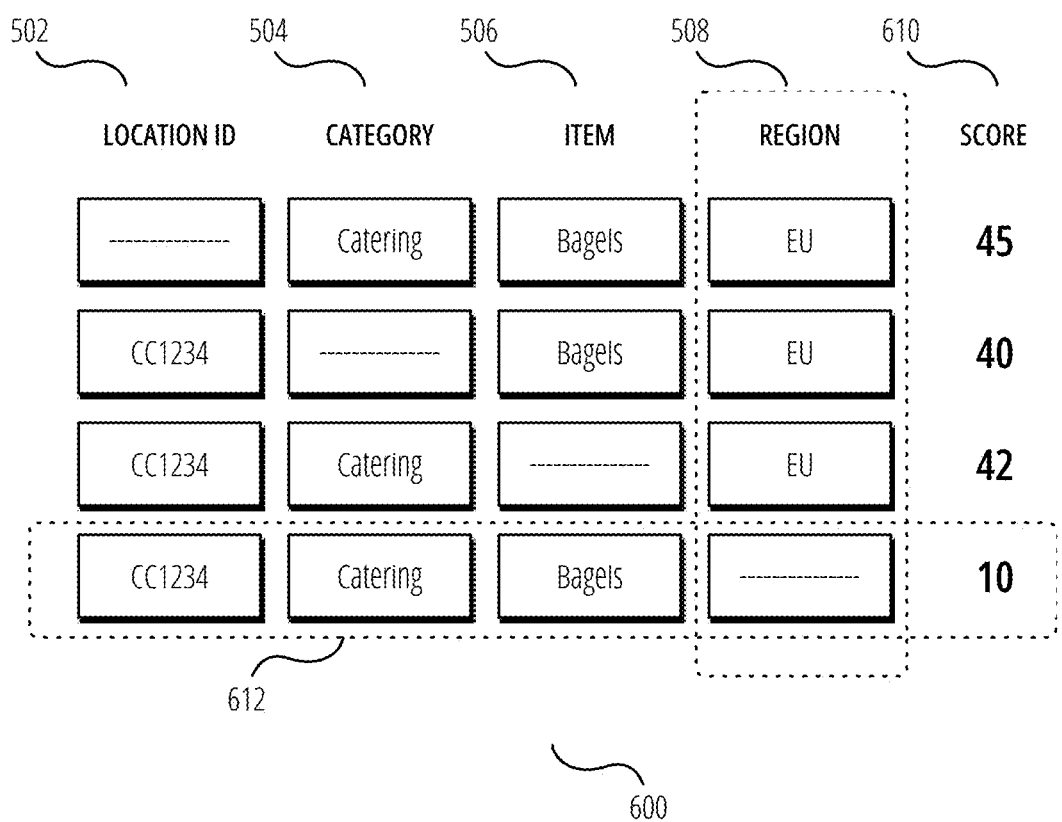
FIG. 6 is a diagram illustrating candidate data records generated to identify an anomalous field and their corresponding scores according to some of the example embodiments.
Figure 7:
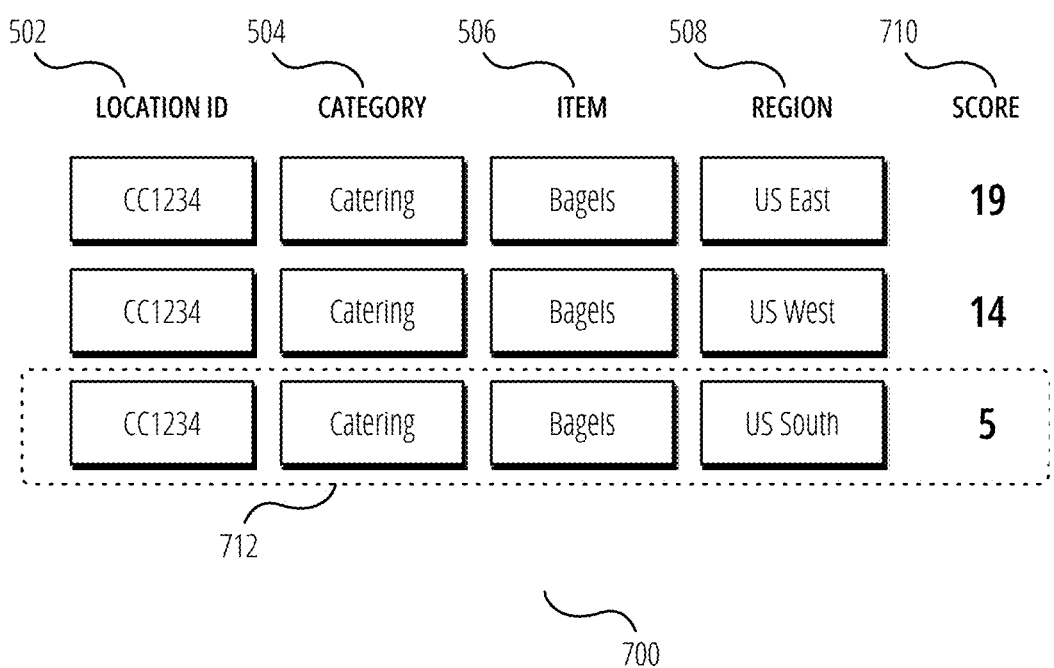
FIG. 7 is a diagram illustrating a permutation of data records, including an anomaly replacement according to some of the example embodiments.

FIGS. 5 through 7 are diagrams illustrating data records processed according to some of the example embodiments.

In FIG. 5, three data records 500 are illustrated. In an embodiment, the three data records 500 represent a simplified example of data records 202. Certainly, in production systems, many more records may be present. In the illustrated embodiment, the schema of the data records includes four fields: a location identifier 502, a category 504, an item identifier 506, and a region identifier 508. In some embodiments, the three data records 500 can represent a ledger of expenses. Notably, in some embodiments, the three data records 500 will not include non-categorical (e.g., numerical features). In some embodiments, however, non-categorical data such as numerical data can be converted to categorical data (e.g., via categorization into percentiles or quartiles) and used in the example embodiments. The three data records 500 also include a score 510. In an embodiment, the score 510 is generated by, for example, risk score model 204 during an initial scoring. In some embodiments, the item identifier 506 corresponds to scores 206. As illustrated, a risky record 512 is highlighted. In some embodiments, a hypothetical, non-limiting score threshold of thirty-five can be used, and any record having a risk score above this threshold is identified as potentially anomalous. Thus, risky record 512 can be identified as anomalous and included in the list of potentially anomalous data records for the data set.

In FIG. 6, four temporary records 600 are illustrated. The four temporary records 600 correspond to the risky record 512. However, each field (location identifier 502, category 504, item identifier 506, region identifier 508) is sequentially removed from the record and scored to generate a new score 610 for each of the four temporary records 600. In the illustrated embodiment, the first three of the four temporary records 600 have scores above the score threshold (thirty-five) and thus are still anomalous. However, a highlighted record 612 has a score of ten and is thus no longer anomalous. Thus, it can be inferred that the region identifier 508 includes the value that rendered the risky record 512 anomalous.

In FIG. 7, a set of permutations 700 is generated based on risky record 512 and the region identifier 508 field flagged in FIG. 6. Specifically, the original value of the region identifier 508 field in risky record 512 ("EU") is replaced by a set of alternative values (namely, "US East," "US West," and "US South"). As illustrated by score 710, each of the permutations has scores lower than the risk threshold and, as such, as potentially non-anomalous. In some embodiments, the system can output all non-anomalous permutations. However, as illustrated, in some embodiments, the system can select the lowest scoring permutation 712 and output the lowest scoring permutation 712 as a potential replacement record for risky record 512.

Figure 8:
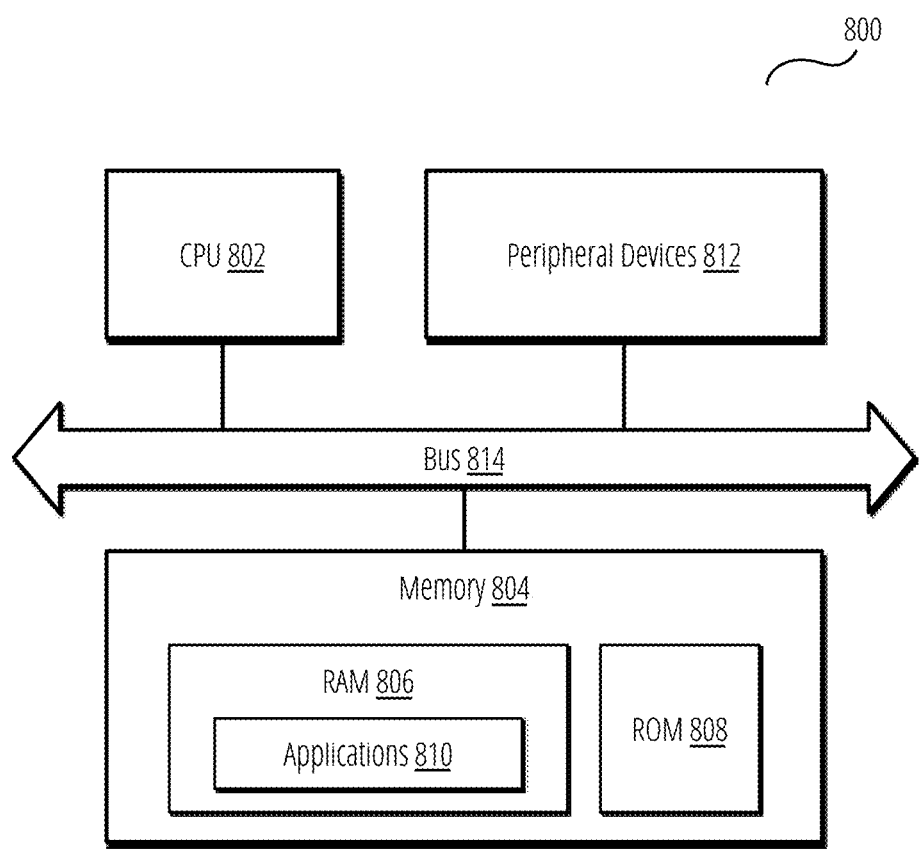
FIG. 8 is a block diagram of a computing device according to some embodiments of the disclosure.

FIG. 8 is a block diagram of a computing device according to some embodiments of the disclosure.

In some embodiments, the computing device 800 can be used to perform the methods described above or implement the components depicted in the foregoing figures.

As illustrated, the computing device 800 includes a processor or central processing unit (CPU) such as CPU 802 in communication with a memory 804 via a bus 814. The device also includes one or more input/output (I/O) or peripheral devices 812. Examples of peripheral devices include, but are not limited to, network interfaces, audio interfaces, display devices, keypads, mice, keyboard, touch screens, illuminators, haptic interfaces, global positioning system (GPS) receivers, cameras, or other optical, thermal, or electromagnetic sensors.

In some embodiments, the CPU 802 may comprise a general-purpose CPU. The CPU 802 may comprise a single-core or multiple-core CPU. The CPU 802 may comprise a system-on-a-chip (SoC) or a similar embedded system. In some embodiments, a graphics processing unit (GPU) may be used in place of, or in combination with, a CPU 802. Memory 804 may comprise a non-transitory memory system including a dynamic random-access memory (DRAM), static random-access memory (SRAM), Flash (e.g., NAND Flash), or combinations thereof. In one embodiment, bus 814 may comprise a Peripheral Component Interconnect Express (PCIe) bus. In some embodiments, bus 814 may comprise multiple busses instead of a single bus.

Memory 804 illustrates an example of non-transitory computer storage media for the storage of information such as computer-readable instructions, data structures, program modules, or other data. Memory 804 can store a basic input/output system (BIOS) in read-only memory (ROM), such as ROM 808, for controlling the low-level operation of the device. The memory can also store an operating system in random-access memory (RAM) for controlling the operation of the device Applications 810 may include computer-executable instructions which, when executed by the device, perform any of the methods (or portions of the methods) described previously in the description of the preceding Figures. In some embodiments, the software or programs implementing the method embodiments can be read from a hard disk drive (not illustrated) and temporarily stored in RAM 806 by CPU 802. CPU 802 may then read the software or data from RAM 806, process them, and store them in RAM 806 again.

The computing device 800 may optionally communicate with a base station (not shown) or directly with another computing device. One or more network interfaces in peripheral devices 812 are sometimes referred to as a transceiver, transceiving device, or network interface card (NIC).

An audio interface in peripheral devices 812 produces and receives audio signals such as the sound of a human voice. For example, an audio interface may be coupled to a speaker and microphone (not shown) to enable telecommunication with others or generate an audio acknowledgment for some action. Displays in peripheral devices 812 may comprise liquid crystal display (LCD), gas plasma, light-emitting diode (LED), or any other type of display device used with a computing device. A display may also include a touch-sensitive screen arranged to receive input from an object such as a stylus or a digit from a human hand.

A keypad in peripheral devices 812 may comprise any input device arranged to receive input from a user. An illuminator in peripheral devices 812 may provide a status indication or provide light. The device can also comprise an input/output interface in peripheral devices 812 for communication with external devices, using communication technologies, such as USB, infrared, Bluetooth™, or the like. A haptic interface in peripheral devices 812 provides tactile feedback to a user of the client device.

A GPS receiver in peripheral devices 812 can determine the physical coordinates of the device on the surface of the Earth, which typically outputs a location as latitude and longitude values. A GPS receiver can also employ other geo-positioning mechanisms, including, but not limited to, triangulation, assisted GPS (AGPS), E-OTD, CI, SAI, ETA, BSS, or the like, to further determine the physical location of the device on the surface of the Earth. In one embodiment, however, the device may communicate through other components, providing other information that may be employed to determine the physical location of the device, including, for example, a media access control (MAC) address, Internet Protocol (IP) address, or the like.

The device may include more or fewer components than those shown in FIG. 8, depending on the deployment or usage of the device. For example, a server computing device, such as a rack-mounted server, may not include audio interfaces, displays, keypads, illuminators, haptic interfaces, Global Positioning System (GPS) receivers, or cameras/sensors. Some devices may include additional components not shown, such as graphics processing unit (GPU) devices, cryptographic co-processors, artificial intelligence (AI) accelerators, or other peripheral devices.

The subject matter disclosed above may, however, be embodied in a variety of different forms and, therefore, covered or claimed subject matter is intended to be construed as not being limited to any example embodiments set forth herein; example embodiments are provided merely to be illustrative. Likewise, the claimed or covered subject matter is intended to be broadly interpreted. Among other things, for example, the subject matter may be embodied as methods, devices, components, or systems. Accordingly, embodiments may, for example, take the form of hardware, software, firmware, or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in an embodiment" as used herein does not necessarily refer to the same embodiment, and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms such as "or," "and," or "and/or," as used herein may include a variety of meanings that may depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms, such as "a," "an," or "the," again, can be understood to convey a singular usage or to convey a plural usage, depending at least in part upon context. In addition, the term "based on" may be understood as not necessarily intended to convey an exclusive set of factors and may, instead, allow for the existence of additional factors not necessarily expressly described, again, depending at least in part on context.

The present disclosure is described with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general-purpose computer to alter its function as detailed herein, a special purpose computer, application-specific integrated circuit (ASIC), or other programmable data processing apparatus, such that the instructions, which execute via the processor of the computer or other programmable data processing apparatus, implement the functions/acts specified in the block diagrams or operational block or blocks. In some alternate implementations, the functions or acts noted in the blocks can occur in any order other than those noted in the illustrations. For example, two blocks shown in succession can, in fact, be executed substantially concurrently, or the blocks can sometimes be executed in the reverse order, depending upon the functionality or acts involved.

These computer program instructions can be provided to a processor of a general-purpose computer to alter its function to a special purpose; a special purpose computer; ASIC; or other programmable digital data processing apparatus, such that the instructions, which execute via the processor of the computer or other programmable data processing apparatus, implement the functions or acts specified in the block diagrams or operational block or blocks, thereby transforming their functionality in accordance with embodiments herein.

For the purposes of this disclosure, a computer-readable medium (or computer-readable storage medium) stores computer data, which data can include computer program code or instructions that are executable by a computer, in machine-readable form. By way of example, and not limitation, a computer-readable medium may comprise computer-readable storage media for tangible or fixed storage of data or communication media for transient interpretation of code-containing signals. Computer-readable storage media, as used herein, refers to physical or tangible storage (as opposed to signals) and includes without limitation volatile and non-volatile, removable, and non-removable media implemented in any method or technology for the tangible storage of information such as computer-readable instructions, data structures, program modules or other data. Computer-readable storage media includes, but is not limited to, RAM, ROM, EPROM, EEPROM, flash memory or other solid-state memory technology, CD-ROM, DVD, or other optical storage, magnetic cassettes, magnetic tape, magnetic disk storage, or other magnetic storage devices, or any other physical or material medium which can be used to tangibly store the desired information or data or instructions and which can be accessed by a computer or processor.

For the purposes of this disclosure, a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer-readable medium for execution by a processor. Modules may be integral to one or more servers or be loaded and executed by one or more servers. One or more modules may be grouped into an engine or an application.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than or more than all the features described herein are possible.

Functionality may also be, in whole or in part, distributed among multiple components, in manners now known or to become known. Thus, a myriad of software, hardware, and firmware combinations are possible in achieving the functions, features, interfaces, and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example to provide a complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A method comprising:
   receiving, by a processor, a data record having a plurality of fields;
   training, by the processor, an unsupervised machine learning model on historical data records by iteratively selecting different subsets of fields from the historical data records using a Bayesian Optimization and Hyperband (BOHB) algorithm to optimize model performance, and training the unsupervised machine learning model using the selected subset of fields that results in optimal model performance, wherein the iterative selection continues until identifying a subset of fields that results in a Bayesian network model having the best association with user-defined fields;
   generating, by the processor, a risk score for the data record using the trained unsupervised machine learning model;
   determining, by the processor, a threshold value based on analyzing a distribution of risk scores from the historical data records generated using the unsupervised machine learning model and selecting a specific quantile value from the distribution;
   determining, by the processor, that the data record is a potential anomaly based on the risk score exceeding the threshold value;
   identifying, by the processor, an anomalous field from the plurality of fields of the data record by iteratively removing each field in the plurality of fields to generate candidate data records, iteratively scoring each of the candidate data records using the unsupervised machine learning model to generate new risk scores for each iteration, selecting a candidate data record ranked with a lowest risk score, and identifying a field removed from the candidate data record as the anomalous field;
   generating, by the processor, a plurality of permutations of the data record, the plurality of permutations generated by changing a value of the anomalous field based on a set of most frequently occurring values for the anomalous field in the historical data records, a number of the plurality of permutations dynamically determined based on available computational resources; and
   outputting, by the processor, a replacement record selected from the plurality of permutations, the replacement record having a field value for the anomalous field that generates a lowest risk score among the plurality of permutations, the lowest risk score selected from a plurality of risk scores generated by inputting the plurality of permutations into the unsupervised machine learning model when scored by iteratively inputting the plurality of permutations into the unsupervised machine learning model.

2. The method of claim 1, wherein determining that the data record is a potential anomaly based on the risk score comprises determining if the risk score exceeds a preconfigured threshold.

3. The method of claim 1, wherein generating the plurality of permutations of the data record comprises:
   identifying a plurality of potential values for the anomalous field;
   setting a value of the anomalous field to each of the plurality of potential values to generate the plurality of permutations; and
   scoring each of the plurality of permutations using the unsupervised machine learning model.

4. The method of claim 3, wherein further comprising selecting the replacement record selected from the plurality of permutations by selecting a permutation from the plurality of permutations ranked with the lowest risk score.

5. The method of claim 1 further comprising:
   updating, by the processor, the historical data records with the selected replacement record; and
   continuously re-training, by the processor, the unsupervised machine learning model using the updated historical data records.

6. The method of claim 1, wherein the subset of fields used to train the unsupervised machine learning model is selected by:
   receiving user-defined fields that must be included in the training;
   iteratively searching, using the Bayesian Optimization and Hyperband (BOHB) algorithm, for additional fields in the historical data records that result in a Bayesian network model with a best association with the user-defined fields; and
   combining the user-defined fields and the additional fields identified by the BOHB algorithm to form the subset of fields for training the unsupervised machine learning model.

7. The method of claim 1, further comprising determining a score threshold for identifying potential anomalies by:
   generating risk scores for a set of historical data records using the unsupervised machine learning model;
   analyzing a distribution of the generated risk scores; and
   setting the score threshold based on a specific quantile of the distributed risk scores, wherein determining that the data record is a potential anomaly comprises comparing the risk score of the data record to the determined score threshold.

8. A non-transitory computer-readable storage medium for tangibly storing computer program instructions capable of being executed by a computer processor, the computer program instructions defining steps of:

receiving a data record having a plurality of fields;

training an unsupervised machine learning model on historical data records by iteratively selecting different subsets of fields from the historical data records using a Bayesian Optimization and Hyperband (BOHB) algorithm to optimize model performance, and training the unsupervised machine learning model using the selected subset of fields that results in optimal model performance, wherein the iterative selection continues until identifying a subset of fields that results in a Bayesian network model having the best association with user-defined fields;

generating a risk score for the data record using the trained unsupervised machine learning model;

determining a threshold value based on analyzing a distribution of risk scores from the historical data records generated using the unsupervised machine learning model and selecting a specific quantile value from the distribution;

determining that the data record is a potential anomaly based on the risk score exceeding the threshold value;

identifying an anomalous field from the plurality of fields of the data record by iteratively removing each field in the plurality of fields to generate candidate data records, iteratively scoring each of the candidate data records using the unsupervised machine learning model to generate new risk scores for each iteration, selecting a candidate data record ranked with a lowest risk score, and identifying a field removed from the candidate data record as the anomalous field;

generating a plurality of permutations of the data record, the plurality of permutations generated by changing a value of the anomalous field based on a set of most frequently occurring values for the anomalous field in the historical data records, a number of the plurality of permutations dynamically determined based on available computational resources; and outputting a replacement record selected from the plurality of permutations, the replacement record having a field value for the anomalous field that generates a lowest risk score among the plurality of permutations, the lowest risk score selected from a plurality of risk scores generated by inputting the plurality of permutations into the unsupervised machine learning model when scored by iteratively inputting the plurality of permutations into the unsupervised machine learning model.

9. The non-transitory computer-readable storage medium of claim 8, wherein determining that the data record is a potential anomaly based on the risk score comprises determining if the risk score exceeds a preconfigured threshold.

10. The non-transitory computer-readable storage medium of claim 8, wherein generating the plurality of permutations of the data record comprises:

identifying a plurality of potential values for the anomalous field;

setting a value of the anomalous field to each of the plurality of potential values to generate the plurality of permutations; and scoring each of the plurality of permutations using the unsupervised machine learning model.

11. The non-transitory computer-readable storage medium of claim 10, the steps further comprising selecting the replacement record selected from the plurality of permutations by selecting a permutation from the plurality of permutations ranked with the lowest risk score.

12. The non-transitory computer-readable storage medium of claim 8, the steps further comprising:

updating, by the processor, the historical data records with the selected replacement record; and continuously re-training, by the processor, the unsupervised machine learning model using the updated historical data records.

13. The non-transitory computer-readable storage medium of claim 8, wherein the subset of fields used to train the unsupervised machine learning model is selected by:

receiving user-defined fields that must be included in the training;

iteratively searching, using the Bayesian Optimization and Hyperband (BOHB) algorithm, for additional fields in the historical data records that result in a Bayesian network model with a best association with the user-defined fields; and combining the user-defined fields and the additional fields identified by the BOHB algorithm to form the subset of fields for training the unsupervised machine learning model.

14. The non-transitory computer-readable storage medium of claim 8, the steps further comprising determining a score threshold for identifying potential anomalies by:

generating risk scores for a set of historical data records using the unsupervised machine learning model;

analyzing a distribution of the generated risk scores; and setting the score threshold based on a specific quantile of the distributed risk scores, wherein determining that the data record is a potential anomaly comprises comparing the risk score of the data record to the determined score threshold.

15. A system comprising:

a processor configured to:

receive a data record having a plurality of fields;

training an unsupervised machine learning model on historical data records by iteratively selecting different subsets of fields from the historical data records using a Bayesian Optimization and Hyperband (BOHB) algorithm to optimize model performance, and training the unsupervised machine learning model using the selected subset of fields that results in optimal model performance, wherein the iterative selection continues until identifying a subset of fields that results in a Bayesian network model having the best association with user-defined fields;

generate a risk score for the data record using the trained unsupervised machine learning model;

determine a threshold value based on analyzing a distribution of risk scores from the historical data records generated using the unsupervised machine learning model and selecting a specific quantile value from the distribution;

determine that the data record is a potential anomaly based on the risk score exceeding the threshold value;

identify an anomalous field from the plurality of fields of the data record by iteratively removing each field in the plurality of fields to generate candidate data records, iteratively scoring each of the candidate data records using the unsupervised machine learning model to generate new risk scores for each iteration, selecting a candidate data record ranked with a lowest risk score, and identifying a field removed from the candidate data record as the anomalous field;

generate a plurality of permutations of the data record, the plurality of permutations generated by changing a value of the anomalous field based on a set of most frequently occurring values for the anomalous field in the historical data records, a number of the plurality of permutations dynamically determined based on available computational resources; and output a replacement record selected from the plurality of permutations, the replacement record having a field value for the anomalous field that generates a lowest risk score among the plurality of permutations, the lowest risk score selected from a plurality of risk scores generated by inputting the plurality of permutations into the unsupervised machine learning model when scored by iteratively inputting the plurality of permutations into the unsupervised machine learning model.

16. The system of claim 15, wherein determining that the data record is a potential anomaly based on the risk score comprises determining if the risk score exceeds a preconfigured threshold.

17. The system of claim 15, wherein generating the plurality of permutations of the data record comprises:
identifying a plurality of potential values for the anomalous field;
setting a value of the anomalous field to each of the plurality of potential values to generate the plurality of permutations; and
scoring each of the plurality of permutations using the unsupervised machine learning model.

18. The system of claim 17, wherein the processor is further configured to select the replacement record selected from the plurality of permutations by selecting a permutation from the plurality of permutations ranked with the lowest risk score.

19. The system of claim 15, the processor further configured to:
update, by the processor, the historical data records with the selected replacement record; and
continuously re-train, by the processor, the unsupervised machine learning model using the updated historical data records.

20. The system of claim 15, wherein the subset of fields used to train the unsupervised machine learning model is selected by:
receiving user-defined fields that must be included in the training;
iteratively searching, using the Bayesian Optimization and Hyperband (BOHB) algorithm, for additional fields in the historical data records that result in a Bayesian network model with a best association with the user-defined fields; and
combining the user-defined fields and the additional fields identified by the BOHB algorithm to form the subset of fields for training the unsupervised machine learning model;
receiving user-defined fields that must be included in the training;
iteratively searching, using the Bayesian Optimization and Hyperband (BOHB) algorithm, for additional fields in the historical data records that result in a Bayesian network model with a best association with the user-defined fields; and
combining the user-defined fields and the additional fields identified by the BOHB algorithm to form the subset of fields for training the unsupervised machine learning model.

* * * * *